US012597569B2

(12) United States Patent
Kwon et al.

(10) Patent No.: US 12,597,569 B2
(45) Date of Patent: Apr. 7, 2026

(54) STRUCTURE FOR TURNING OFF VANITY LAMP FOR VEHICLE USING SUN VISOR

(71) Applicant: DAEHAN SOLUTION CO., LTD., Incheon (KR)

(72) Inventors: Choong Ho Kwon, Seoul (KR); Hang Sik Choi, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 43 days.

(21) Appl. No.: 18/910,193

(22) Filed: Oct. 9, 2024

(65) Prior Publication Data

US 2025/0140488 A1 May 1, 2025

(30) Foreign Application Priority Data

Oct. 31, 2023 (KR) ........................ 10-2023-0147436

(51) Int. Cl.

*F21V 23/04* (2006.01)
*H01H 3/50* (2006.01)
*F21W 106/00* (2018.01)

(52) U.S. Cl.

CPC ............... *H01H 3/50* (2013.01); *F21V 23/04* (2013.01); *F21W 2106/00* (2018.01); *H01H 2003/506* (2013.01); *H01H 2221/048* (2013.01)

(58) Field of Classification Search

CPC ............... H01H 3/50; H01H 2003/506; H01H 2221/048; F21V 23/04; F21W 2106/00
See application file for complete search history.

(56) References Cited

U.S. PATENT DOCUMENTS

| | | | | |
|---|---|---|---|---|
| 10,906,381 | B1 * | 2/2021 | Muhammad | B60J 3/0213 |
| 2021/0316658 | A1 * | 10/2021 | Jiang | B60Q 3/82 |
| 2022/0097496 | A1 * | 3/2022 | Cheng | B60J 3/0282 |
| 2023/0011607 | A1 * | 1/2023 | Haraguchi | H01H 36/0013 |
| 2025/0091506 | A1 * | 3/2025 | Kwon | B60Q 3/20 |
| 2025/0332890 | A1 * | 10/2025 | Boehm | B60J 3/0239 |

FOREIGN PATENT DOCUMENTS

| | | | |
|---|---|---|---|
| KR | 10-2005-0022123 | A | 3/2005 |
| KR | 10-0610376 | B1 | 8/2006 |
| KR | 10-2010-0009796 | A | 1/2010 |

* cited by examiner

*Primary Examiner* — Christopher E Dunay

(74) *Attorney, Agent, or Firm* — Dickinson Wright PLLC

(57) ABSTRACT

In the present invention, magnets are mounted in a button part of a vanity lamp exposed toward a vehicle interior and a portion of a sun visor facing the button part to provide both a repulsive force and an attractive force so that a sun visor returns to a predetermined location with respect to the button part when the sun visor is folded, thereby preventing a phenomenon in which the vanity lamp is not turned off and a surface of the sun visor is damaged when the sun visor is folded and conveniently using the sun visor. Particularly, in the present invention, the vanity lamp can be turned off through only a simple manipulation of folding the sun visor without separate power by using permanent magnets as the magnets.

3 Claims, 6 Drawing Sheets

STRUCTURE FOR TURNING OFF VANITY LAMP FOR VEHICLE USING SUN VISOR

CROSS-REFERENCE TO RELATED APPLICATION

This application claims priority to and the benefit of Korean Patent Application No. 10-2023-0147436, filed Oct. 31, 2023, the disclosure of which is incorporated herein by reference in its entirety.

BACKGROUND

1. Field of the Invention

The present invention relates to a structure for turning off a vanity lamp for a vehicle using a sun visor, and more specifically, to a structure for turning off a vanity lamp for a vehicle using a sun visor, which prevents a vanity lamp from not being turned off or a surface of a sun visor from being imprinted by a pressure of a button part after the sun visor is folded, by providing magnets mounted in the button part of the vanity lamp and a portion of the sun visor facing the button part to position the button part at a predetermined location due to magnetic force to perform position adjustment when the sun visor is not used and is folded toward a headliner.

2. Discussion of Related Art

In general, a vanity lamp is mounted on the surface of a sun visor facing a headliner in a vehicle. The vanity lamp illuminates its surrounding area so that makeup application or the like can be conveniently performed when the surrounding area is dark like at night. Such a vanity lamp is frequently used with a mirror by unfolding a sun visor as in the following Patent Documents 1 to 3, wherein the mirror is installed on a surface facing a headliner.

(Patent Document 1) Korean Laid-Open Patent No. 10-2005-0022123

This is related to a vanity mirror for a vehicle, and provided with an auxiliary lamp including an extension, which extends from a body of a vanity mirror and in which a hole is formed, a lamp, which is connected to a power source part located in the hole and emits light downward through the hole, a lens installed on an inner circumferential surface of the hole, and a switch, which is installed at the other side of the extension and controls power of the power source part so that a lighting device installed on the vanity mirror illuminates a face of a user and the auxiliary lamp illuminates a lower body of the user to allow the user to easily check a facial area, an object held by a hand, or a state thereof. In addition, the auxiliary lamp is operated independently of the vanity mirror to facilitate reading or checking a map, thereby further improving practicality and user convenience of the vanity mirror.

(Patent Document 2) Korean Registered Patent No. 10-0610376

This relates to a double foldable rear vanity mirror for a vehicle, which may be easily used by a rear seat passenger of a vehicle when the rear seat passenger is positioned any position or is in any situation or an interior of the vehicle is dark. The rear vanity mirror, which is attached to a roof headlining of a vehicle roof panel, includes an upper body, which is hinge-coupled to the roof headlining by hinge pins formed on both end portions of an upper portion and in which a support including a through groove into which a fixing pin having a predetermined length is inserted is formed on a lower portion to protrude and hooking grooves on which hooking members of the roof headlining are hooked are formed in predetermined portions of both sides, and a lower body, in which an extension having a through groove formed at one side is formed so that the lower body is rotatably coupled to the upper body and which includes on mirror on a foldable inner side and two lamps at both sides of the mirror.

(Patent Document 3) Korean Laid-Open Patent No. 10-2010-0009796

This is related to a vanity mirror apparatus for a vehicle, and more specifically, to a vanity mirror apparatus for a vehicle, in which a mirror lighting device and an interior lighting device are installed on both sides of a vanity mirror so that the interior lighting device operates when a mirror is not used. The present invention provides a vanity mirror apparatus for a vehicle, the vanity mirror apparatus including a mirror at one side of a body rotatably installed on a housing and illuminating a user at the same time when the mirror is used, wherein the body includes the mirror, a mirror lighting device for emitting light toward a user using the mirror, and an interior lighting device for emitting light to a vehicle interior when the mirror lighting device does not operate.

RELATED ART

Patent Documents (Patent Document 1) Korean Laid-open Patent No. 10-2005-0022123 (Published Date: Mar. 7, 2005)
(Patent Document 2) Korean Registered Patent No. 10-0610376 (Registration Date: Aug. 1, 2006)
(Patent Document 3) Korean Laid-open Patent No. 10-2010-0009796 (Published Date: Jan. 29, 2010)

SUMMARY OF THE INVENTION

However, such an existing vanity lamp has the following problems.

(1) When a sun visor in close contact with a headliner is unfolded, a vanity lamp is turned on, and conversely, when the sun visor is folded to be in close contact with the headliner, the sun visor pushes a button part of the vanity lamp to turn the vanity lamp off. In this case, a phenomenon in which the vanity lamp is not turned off even when the sun visor is folded because the button part of the vanity lamp is moved from a predetermined location due to an impact occurring when the sun visor hits the headliner or an impact occurring when a vehicle travels occurs.

(2) In addition, as the button part protrudes from the vanity lamp, when the sun visor is folded to be in close contact with the headliner, a surface of the sun visor is pressed or imprinted by the protruding button part and a surface of the sun visor is damaged or the button part is not smoothly operated.

(3) In addition, the button part can sag downward due to the impact when the sun visor is folded, vibrations generated during traveling, and gravity being applied to the button part, and when the sun visor is folded while the button part is sagging, a situation in which the button part cannot turn the vanity lamp off can occur.

(4) In addition, such problems can occur when foreign matter inserted between a main body of the vanity lamp and the button part hinders movement of the button part.

The present invention is disclosed in consideration of the above problems and is directed to providing a structure for turning off a vanity lamp for a vehicle using a sun visor, in which magnets are mounted in a button part of a vanity lamp exposed toward a vehicle interior and a portion of a sun visor facing the button part to provide both a repulsive force and an attractive force so that the sun visor returns to a predetermined location with respect to the button part when the sun visor is folded, thereby preventing a phenomenon in which the vanity lamp is not turned off and a surface of the sun visor is damaged when the sun visor is folded and conveniently using the sun visor.

Particularly, the present invention is also directed to providing a structure for turning off a vanity lamp for a vehicle using a sun visor, which turns the vanity lamp off through only a simple manipulation of folding the sun visor without separate power by using permanent magnets as the magnets used as described above.

In addition, the present invention is also directed to providing a structure for turning off a vanity lamp for a vehicle using a sun visor, in which a button part is easily pressed to smoothly turn the vanity lamp off and a surface of the sun visor is protected by using a paper magnet formed to be folded in a paper form as a permanent magnet mounted in the sun visor.

According to an aspect of the present invention, there is provided a structure for turning off a vanity lamp for a vehicle using a sun visor, which includes a main body (100) which is mounted in a headliner (H) and of which one side is installed to be exposed toward a vehicle interior and a button (110) which is installed in the main body (100) such that a portion of the button (110) protrudes outward from the main body (100) and serves as a switch by being pressed by the sun visor (200) when the sun visor (200) is folded, wherein a first magnet (111) having different polarities at locations closer to and farther from a rotary center of the sun visor (200) is mounted in the button (110), a second magnet (210) is installed in the sun visor (200) at a location facing the first magnet (111), a polarity of the second magnet (210) is different from that of a portion of the first magnet (111) disposed closer to the sun visor (200), and a polarity of the second magnet (210) is the same as that of a portion of the first magnet (111) disposed farther from the sun visor (200).

Particularly, each of the first magnet (111) and the second magnet (210) may be a permanent magnet.

In this case, the second magnet (210) may be a paper magnet.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
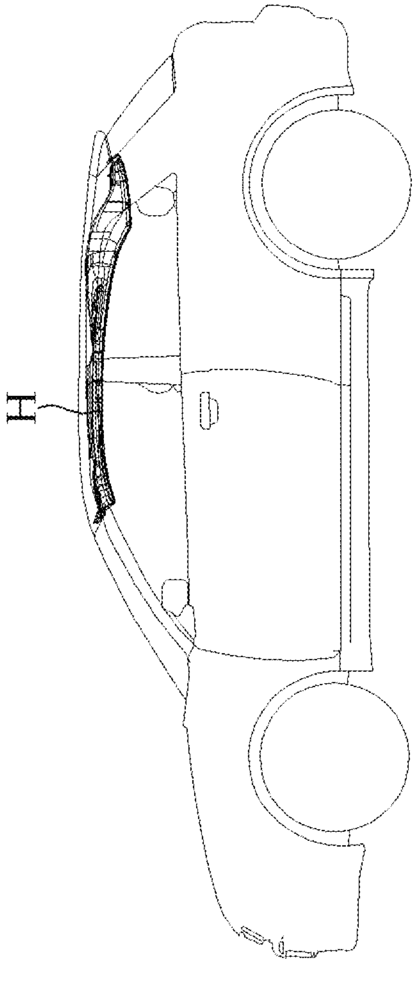
FIG. 1 is a side view illustrating a vehicle, which shows a location at which a headliner, on which a structure for turning off a vanity lamp for a vehicle using a sun visor is mounted, is mounted in the vehicle according to the present invention.
Figure 2:
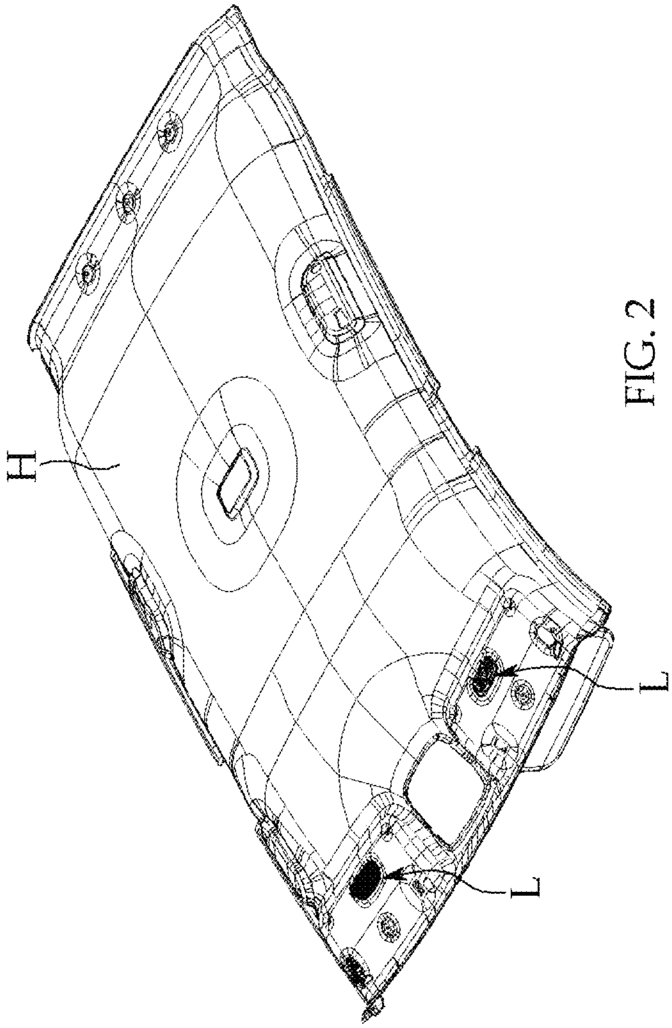
FIG. 2 is a perspective view illustrating the headliner, on which the structure for turning off a vanity lamp for a vehicle using a sun visor is mounted, according to the present invention.

Hereinafter, exemplary embodiments of the present invention will be described in more detail with reference to the accompanying drawings. Moreover, terms and words used in the present specification and claims should not be interpreted as being limited to commonly used meanings or meanings in dictionaries and should be interpreted as having meanings and concepts which are consistent with the technological scope of the invention based on the principle that the inventors have appropriately defined concepts of terms in order to describe the invention in the best way.

Therefore, since the embodiments described in this specification and components illustrated in the drawings are only exemplary embodiments and do not represent the overall technological scope of the invention, it should be understood that there may be various equivalents or modifications substituting the exemplary embodiments at the time of filing of this application.

[Structure for Turning off Vanity Lamp for Vehicle Using Sun Visor]

As illustrated in FIGS. 1 to 6, a structure for turning off a vanity lamp for a vehicle using a sun visor according to the present invention includes a main body 100 installed on a headliner H such that a portion of a button 110 is exposed toward a vehicle interior and a sun visor 200 installed on the headliner H to be folded toward the headliner H on which the main body 100 is installed or to be unfolded.

Particularly, a first magnet 111 is installed in the button 110 protruding toward the vehicle interior from the headliner H such that polarities thereof are different at locations closer to and farther from a rotary center of the sun visor 200, a second magnet 210 is mounted on a surface of the sun visor 200 facing the first magnet 111, the second magnet 210 has a different polarity from a portion of the first magnet 111 closer to the rotary center of the sun visor 200 and has the same polarity as a portion of the first magnet 111 farther from the rotary center of the sun visor 200, and a portion of the button 110 protruding from the main body 100 is moved to be parallel to the headliner H so that the button 110 may smoothly turn the vanity lamp L off when the sun visor 200 is folded.

In this case, as a permanent magnet is used as each of the first magnet 111 and the second magnet 210, the vanity lamp L can be stably turned off even without using power used in the vehicle.

In addition, as a paper magnet which is bent like paper is used as the second magnet 210, the surface of the sun visor 200 can stably perform a turning-off operation without being torn or damaged from an impact applied when the sun visor 200 is folded toward the portion of the button 110.

Hereinafter, such a structure will be described in more detail with reference to the accompanying drawings.

A. Vanity Lamp

The vanity lamp Lis mounted at a location facing the surface of the sun visor 200 installed at a location on the headliner H to be unfolded and used by people seated on a driver seat and a passenger seat as illustrated in FIGS. 1 to 4.

Figure 3:
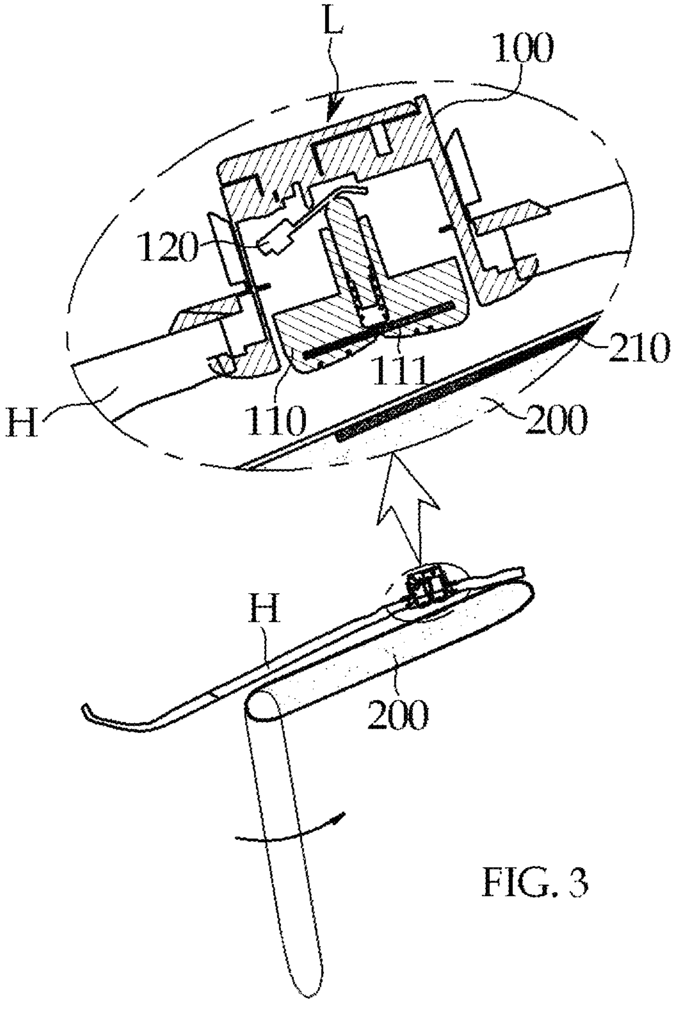
FIG. 3 is an enlarged cross-sectional view illustrating a vanity lamp part, which shows the structure for turning off a vanity lamp for a vehicle using a sun visor according to the present invention.
Figure 4:
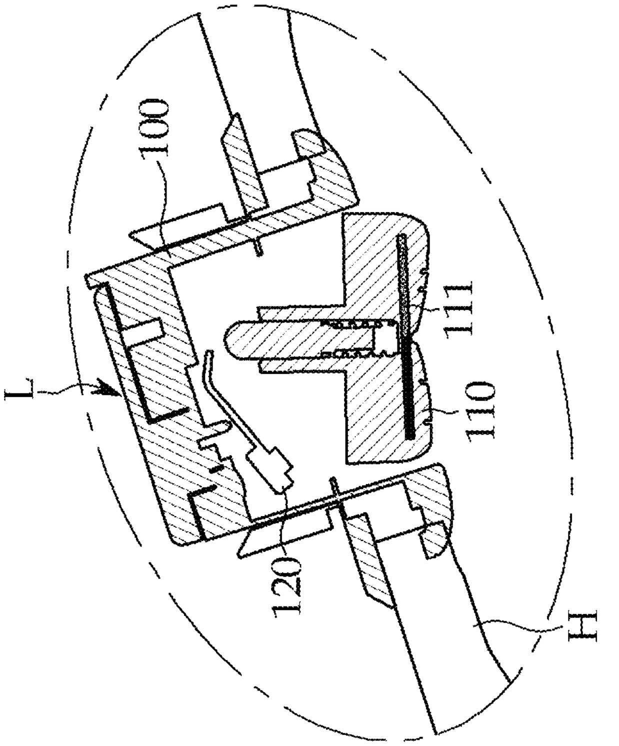
FIG. 4 is an enlarged cross-sectional view illustrating the vanity lamp in a state in which a button part is moved from a predetermined location according to the present invention.

In this case, the vanity lamp L includes the main body 100 which is installed to pass through the headliner H and of which an entrance portion is exposed to the vehicle interior and the button 110 which is installed in the main body 100 and of which a portion protrudes outward from the headliner H to come into contact with and be pressed by the surface of the sun visor 200 as illustrated in FIGS. 3 and 4. In addition, when the button 110 is pressed by the sun visor 200 at a side of the vehicle interior, an electrical terminal 120 installed in the main body 100 is pressed to disconnect electrical connection of the terminal and turn the vanity lamp L off.

Meanwhile, the first magnet 111 is mounted in the button 110 as illustrated in FIGS. 3 and 4.

First Magnet

The first magnet 111 is mounted in the button 110 as illustrated in FIGS. 3 and 4. In this case, as the first magnet 111 is mounted in a protruding portion of the button 110 to protrude from the headliner H toward the vehicle interior and come into contact with the sun visor 200 which will be described below, it is preferable that the first magnet 111 smoothly interact with the second magnet 210, which will be described below, installed on the sun visor 200.

In addition, in the exemplary embodiment of the present invention, as illustrated in FIGS. 3 and 4, the first magnet 111 that is installed such that the polarities of the portions closer to and farther from the rotary center of the sun visor 200 are different is preferably used. This to allow an attractive force to act on the portion of the magnet 111 disposed closer to the rotary center of the sun visor 200, and conversely, a repulsive force to act on the portion of the magnet 111 disposed farther from the rotary center of the sun visor 200 using the second magnet 210 so that the portion of the button 110 is stably inserted into the main body 100 to perform the turning-off operation.

In addition, in the exemplary embodiment of the present invention, although an electromagnet may also be used as the first magnet 111, the permanent magnet is preferably used thereas. This is because a structure thereof is complicated when the electromagnet is used, energy efficiency is reduced when the power of the vehicle is used, and the electromagnet easily fails due to an impact when of the sun visor 200 is folded.

The first magnet 111 installed as described above interacts with the second magnet 210 installed on the sun visor 200 when the sun visor 200 is not used and is folded on a surface of the headliner H as illustrated in FIGS. 3 to 6.

B. Sun Visor

As illustrated in FIG. 3, the sun visor 200 is manufactured through a general technology to be mounted on a front edge portion of the headliner H such that people seated on the driver seat and the passenger seat can unfold and use the sun visor 200 as necessary.

Figure 5:
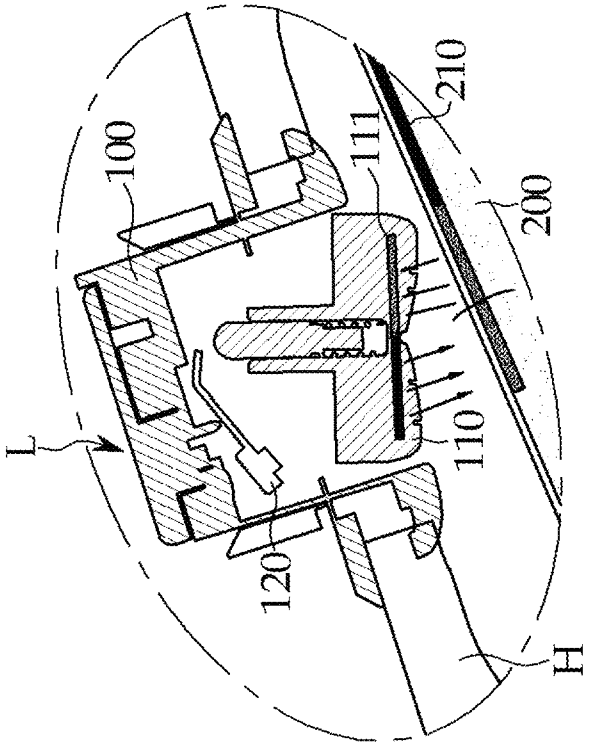
FIG. 5 is an enlarged cross-sectional view showing a direction in which the button part is moved to a predetermined location by magnetic forces as the sun visor is folded in a state in which the button part is moved from the predetermined location.
Figure 6:
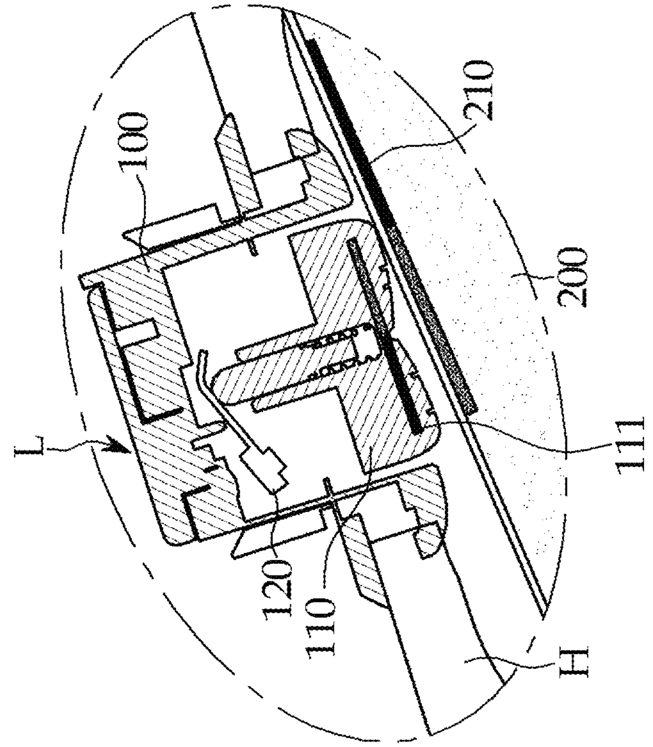
FIG. 6 is an enlarged cross-sectional view showing a state in which the vanity lamp is turned off as the button part is moved to the predetermined location by the magnetic forces when the sun visor is folded according to the present invention.

Meanwhile, the second magnet 210 is mounted in the sun visor 200 at a location facing the button 110 when the sun visor 200 is folded to face the surface of headliner H as illustrated in FIGS. 3, 5, and 6.

Second Magnet

As illustrated in FIGS. 3, 5, and 6, the second magnet 210 may be mounted to face the first magnet 111 so that the button 110 is disposed at a predetermined location, and thereby a switching operation can be easily performed.

To this end, the second magnet 210 is mounted in the sun visor 200 to have a different polarity from the portion of the first magnet 111 closer to a center of the sun visor 200, and conversely, have the same polarity as the portion of the first magnet 111 farther from the center of the sun visor 200 as illustrated in FIGS. 5 and 6.

This is to allow the portion of the button 110 closer to the center of the sun visor to protrude toward the surface of the sun visor 200 due to an attractive force, and conversely, the portion of the button 110 farther from the center of the sun visor to move away from the surface of the sun visor 200 due to a repulsive force when the sun visor 200 is folded toward the surface of the headliner H so that a portion of the button 110 is tilted into an original form and pressed into the main body 100 to perform the turning-off operation as illustrated in FIGS. 4 to 6.

In the exemplary embodiment of the present invention, the permanent magnet may be used as the second magnet 210 for the same reason as the first magnet 111.

In addition, in the exemplary embodiment of the present invention, a paper magnet manufactured to be bent like paper is preferably used as the second magnet 210. This is to protect the sun visor 200 by being tilted a predetermined extent against an impact because the sun visor 200 impacts the portion of the button 110 when the sun visor 200 is folded, and there is a possibility of the surface of the sun visor 200 being torn or damaged when an impacting portion is too hard.

In the present invention described above, as the magnets are disposed on the portion of the button and the surface of the sun visor facing each other to generate the attractive force and the repulsive force, and the portion of the button is provided to be tilted into the predetermined form, the vanity lamp can be stably turned off when the sun visor is folded.

A structure for turning off a vanity lamp for a vehicle using a sun visor according to the present invention has the following effects.

(1) Magnets are mounted in a button part of a vanity lamp exposed to a vehicle interior and a sun visor facing the button part such that a position of the button part is adjusted in a predetermined form through interaction between magnetic forces in which an attractive force and a repulsive force act at the same time when the sun visor is folded, thereby preventing a phenomenon in which the vanity lamp is turned on when the sun visor is folded.

(2) In this case, although an electromagnet can be used as the magnet, by using a permanent magnet is used thereas, energy efficiency of the vehicle is not reduced, and a phenomenon in which the vanity lamp is unnecessarily turned on and consumes energy can be prevented.

(3) In addition, as a paper magnet which is bendable like paper is used as the permanent magnet mounted in the sun visor, the paper magnet can be easily deformed and can withstand an impact applied when the sun visor hits the button part, and a surface of the sun visor can be prevented from being damaged, thereby improving quality thereof.

(4) As described above, since the magnet is used such that the button part performs a turning-off operation at a predetermined location, a structure is simple, and power is not unnecessarily consumed, thereby preventing a phenomenon in which a battery of the vehicle is discharged.

What is claimed is:

1. A structure for turning off a vanity lamp for a vehicle using a sun visor, the structure comprising:

a main body (100) which is mounted in a headliner (H) and of which one side is installed to be exposed toward a vehicle interior; and a button (110) which is installed in the main body (100) such that a portion of the button (110) protrudes outward from the main body (100) and serves as a switch by being pressed by the sun visor (200) when the sun visor (200) is folded, wherein a first magnet (111) having different polarities at locations closer to and farther from a rotary center of the sun visor (200) is mounted in the button (110), a second magnet (210) is installed in the sun visor (200) at a location facing the first magnet (111), a polarity of the second magnet (210) is different from that of a portion of the first magnet (111) disposed closer to the rotary center of the sun visor (200), and a polarity of the second magnet (210) is the same as that of a portion of the first magnet (111) disposed farther from the rotary center of the sun visor (200).

2. The structure of claim 1, wherein each of the first magnet (111) and the second magnet (210) includes a permanent magnet.

3. The structure of claim 2, wherein the second magnet (210) includes a paper magnet.

* * * * *